United States Patent [19]

Rodgers

[11] 4,298,872
[45] Nov. 3, 1981

[54] SIDELOBE BLANKING SYSTEM

[75] Inventor: William E. Rodgers, Simi Valley, Calif.

[73] Assignee: Hughes Aircraft Company, Culver City, Calif.

[21] Appl. No.: 153,284

[22] Filed: May 27, 1980

[51] Int. Cl.$^3$ .............................................. H04B 7/00
[52] U.S. Cl. ............................. 343/100 LE; 455/278
[58] Field of Search .................. 343/100 LE, 100 CL; 455/276, 278, 296

[56] References Cited

U.S. PATENT DOCUMENTS

| | | | |
|---|---|---|---|
| 3,761,923 | 9/1973 | Downie | 343/5 R |
| 3,875,569 | 4/1975 | Hill et al. | 343/5 R |
| 4,021,805 | 5/1977 | Effinger et al. | 343/17.2 PC |
| 4,075,566 | 2/1978 | D'Arcangelis | 455/276 |

Primary Examiner—Theodore M. Blum
Attorney, Agent, or Firm—William J. Benman, Jr.; William H. MacAllister

[57] ABSTRACT

A sidelobe blanking system is provided which uses as much of the existing radar tracking system as possible while requiring a minimal number of additional components. The sidelobe blanking system includes a guard antenna and two phase shifters the first of which is operably coupled to the main radar antenna's sum pattern. The phase shifters create signals of opposite polarities which represent the complex conjugate of the sum pattern from the main radar antenna. The system includes two summing circuits which add the signal received by the guard antenna to the complex conjugate signals of opposite polarity. The system also includes a phase detector which compares the outputs of the first and second summing circuits and generates a signal representative of the cosine of the relative phase angle. The polarity of the output of the phase detector is determinative of whether or not the target being detected is in the sidelobe region or the mainlobe region and is independent of any phase error between the main and guard antennas.

1 Claim, 3 Drawing Figures

SIDELOBE BLANKING SYSTEM

PRELUDE TO BACKGROUND OF THE INVENTION

The invention described herein was made in the course of or under a contract or subcontract thereunder with the U.S. Army.

BACKGROUND OF THE INVENTION

1. Field of the Invention

The present invention relates to radar systems and, more particularly, to improvements in sidelobe blanking systems for radar systems.

While the present invention will be described herein with reference to particular embodiments, it will be understood that the invention is not limited thereto. The principles of this invention may be adapted and employed to meet a variety of requirements as those of ordinary skill in this art will recognize in light of the present disclosure.

2. Description of the Prior Art

Quite often, airborne and radar missile systems must operate in environments where in addition to radar returns from airborne targets to be detected, numerous returns are received from highly reflective ground objects in the main antenna sidelobes. Sources of such returns include terrain irregularities and man-made structures or vehicles. The returns through the main antenna sidelobes frequently produce false airborne target detections, i.e., detections which cannot be distinguished from airborne targets. Thus, effective operation of airborne radar system requires a method of discriminating between the desirable airborne targets whose returns are received through the antenna's mainlobe and the undesirable returns which are received through the main antenna side lobes.

To resolve this problem, some airborne radar systems have employed radar receivers which incorporate a guard channel in addition to the main channel to obtain at least a partial discrimination between desirable and undesirable targets.

A typical sidelobe blanking receiver utilizes an auxiliary or guard antenna to receive the sidelobe signals. The sidelobe signals are processed in the sidelobe receiver in an identical manner to the processing of the signals in the main radar receiver. The guard antenna's spatial coverage substantially matches that of the radar antenna sidelobe pattern with the exception that it has a higher gain configuration. The detected outputs of the two receivers are then compared. If the amplitude of the video from the sidelobe receiver exceeds the amplitude of the radar receiver video, the signal is known to have been received by the sidelobes of the main antenna. A tracking radar receiver can then ignore pulses with that pulse repetition frequency. However, if the amplitude of the radar receiver video exceeds that of the sidelobe receiver video, the target is assumed to be in the main beam and not in the sidelobes. This check is especially important to a tracking radar during initial lock-on.

The necessity for a separate radar receiver adds significantly to the expense of conventional sidelobe blanking systems. Thus it is an object of the present invention to provide a sidelobe blanking system that does not require a separate radar receiver.

Those skilled in the art have come to recognize that encoding the outputs of the main and guard antennas and phase related signals, provides signals which are easier to store and work with. See for example *Radar Handbook*, Merrill I. Skolnik, McGraw-Hill Book Co., 1970, Library of Congress Catalog Card #69-13615, pps. 5-40, 5-41. However, the advantages of this approach have not heretofore been fully realized because the phase error between the guard and main antennas varied for every target as a function of target spatial angle. Thus, it is a still further object of the present invention to provide a sidelobe blanking system which does not require a separate radar receiver, and allows for phase detection, sidelobe blanking while compensating for variable phase error between the main and guard antennas.

SUMMARY OF THE INVENTION

The objects of this invention are achieved by a sidelobe blanking system including a guard antenna for receiving electro-magnetic radiation in the sidelobe region of the main antenna. Two phase shifters are provided, the first of which is operably coupled to the main radar antenna's sum pattern. The output of the first phase shifter is then added to the output of the guard antenna by a summing circuit.

The output of the first phase shifter is shifted again by the second phase shifter and added to the output of the guard antenna by a second summing circuit.

A phase detector compares the outputs of the first and second summing circuits and generates a signal representative of the phase angle therebetween.

The output of the phase detector is a cosine function which varies between plus and minus 1. In the present invention, the polarity of the output of the phase detector is determinative of whether or not the target being detected is in the sidelobe region or the mainlobe region. As described more fully in the detailed description of the invention, the sign of the detector output is independent of any phase error between the main and guard antennas.

DETAILED DESCRIPTION OF THE INVENTION

Figure 1:
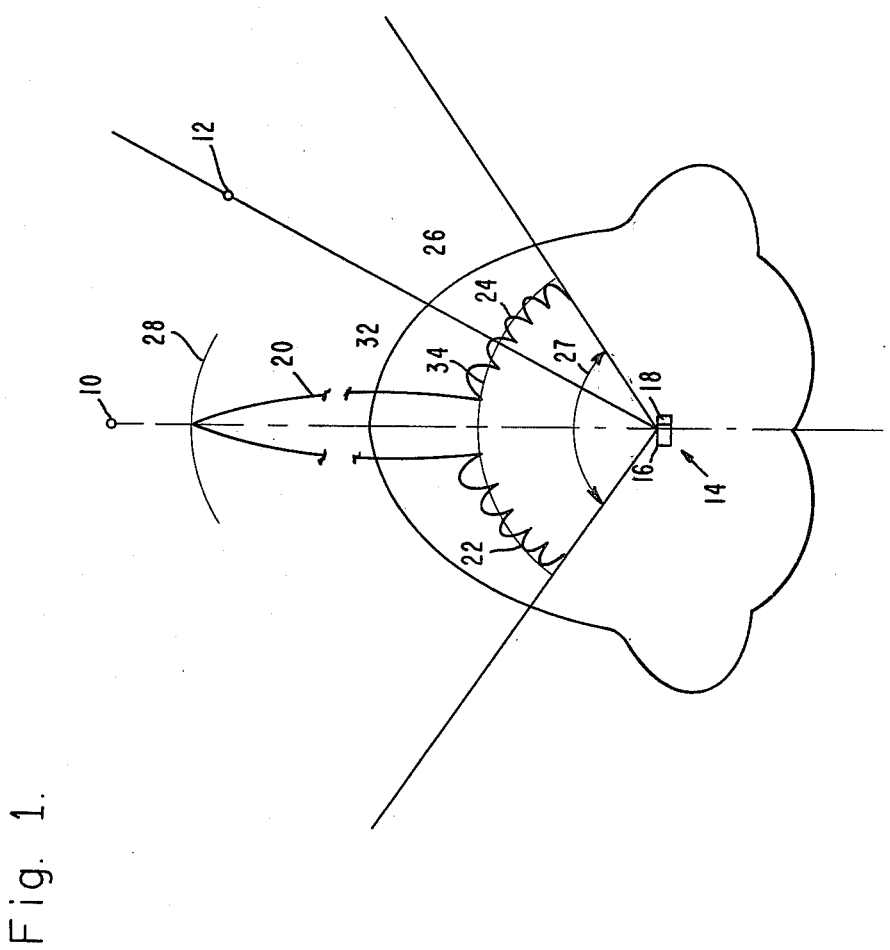
FIG. 1 is a schematic plan view showing the gain characteristics of the mainlobe antenna and the guard antenna in response to the energy received from targets and interfering sources.

The operation of the sidelobe blanking system of the present invention will first be explained with reference to FIG. 1. The operational system will be explained relative to a target 10 and an interfering source 12.

An antenna system 14 may include a mainlobe or radar antenna 16 and a sidelobe or auxiliary antenna 18, normally positioned adjacent to each other or in a close proximity. In some arrangements in accordance with the invention, the antennas 16 and 18 may be different aperature elements in the same array. In the preferred embodiment, the antenna 16 has aperature elements 16a and 16b shown and discussed more fully with reference to FIG. 2. The radar antenna 16 has a mainlobe pattern 20 and a plurality of sidelobe patterns such as 22 and 24. The auxiliary antenna 18 which is the sidelobe antenna may be a low gain antenna and have an antenna pattern such as 26 which is of a substantially constant amplitude over an azimuth receiver range of angle 27. In some arrangements, the sidelobe antenna may be an omnidirectional antenna or a suitable antenna having a constant gain over a predetermined angle. The gain of the mainlobe antenna is shown by a line 28 and the gain of the sidelobe antenna 18 is shown by line 32. The side lobes of the radar antenna have a general amplitude indicated by line 34. Energy from the interfering source 12 has a gain in the sidelobe antenna indicated by the line 32 and a gain in the mainlobe antenna indicated by the line 34. Thus the energy received from the source 12 is interpreted as side lobe energy to be blanked out.

Figure 2:
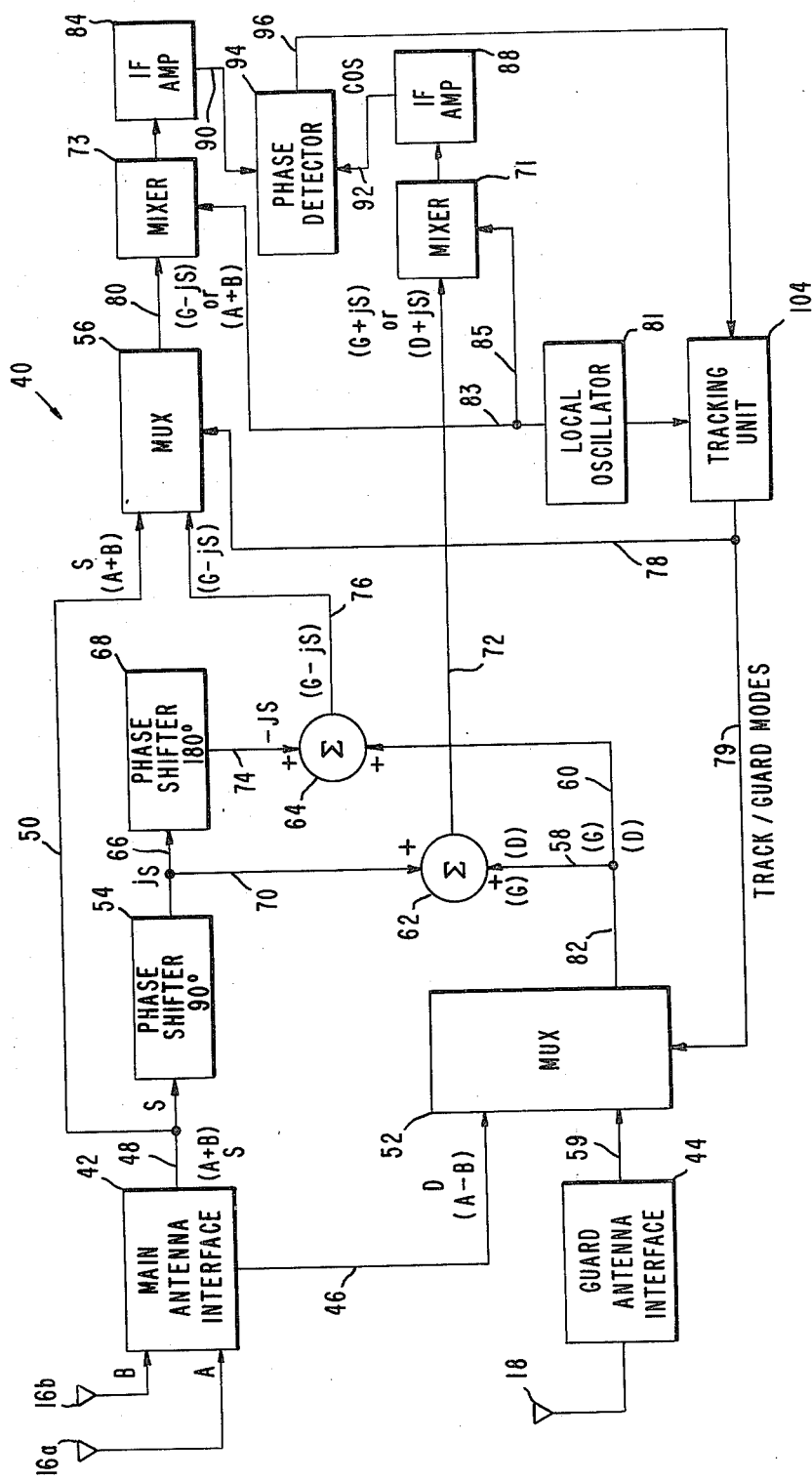
FIG. 2 is a block diagram representation of the sidelobe blanking system of the present invention.

As shown in the block diagram of FIG. 2, the sidelobe blanking system of the present invention 40 is shown with mainlobe antennas 16a and 16b connected to the main antenna interface 42. Guard antenna 18 is similarly shown connected to the guard antenna interface 44. The main antenna interface provides an output on line 46 which represents the difference (D) between the signals A and B received by the antennas 16a and 16b and provides another output on line 48 which represents the sum(s) of the signals A and B received by antennas 16a and 16b. The line 46 provides a connection between the main antenna interface 42 and the multiplexer 52. Line 48 provides a connection between the main antenna interface 42 and a 90° phase shifter 54. The sum of the signals received on antennas 16a and 16b also provides an input to multiplexer 56 by way of line 50. The guard antenna interface 44 provides an output guard signal (G) on line 59 which provides an input to the multiplexer 52. During the guard mode, multiplexer 52 provides inputs to the summers 62 and 64 via lines 82, 58 and 60.

The output of the 90° phase shifter 54 provides a second input to the summer 62 by way of line 70. The output of the 90° phase shifter 54 represents the complex conjugate (jS) of the sum output (S) of the main antenna interface 42 which appears on line 48. The jS signal output of the 90° phase shifter 54 is input to a 180° phase shifter 68. The 180° phase shifter or inverter 68 changes the sign of the signal received on line 66 and outputs it on line 74 for input to summer 64.

During a guard mode, the output of the summer 62 represents the sum of the guard signal (G) and the complex conjugate (jS) of the sum signal S. During a track mode, line 58 provides the difference signal (D) to the summer 62. The output of the summer 62 appears on line 72 and provides the input to the mixer/IF amplifier 71/88.

During the guard mode, the output of the summer 64 represents the summation of the guard signal G and the opposite of the complex conjugate (−jS). This signal appears on line 76 as a second input to the multiplexer 56. Thus the multiplexer 56 switches between the sum signal (S) and the output of the summer 64 at a predetermined intervals determined by a tracking unit 104 via line 78.

Similarly, the multiplexer 52 switches between the difference signal D and the output of the guard antenna intereface 44 on predetermined intervals determined by the tracking unit 104. Line 80 thus carries a signal representing the sum-signal S or the guard signal minus the complex conjugate of the sum S ie (G−jS) and couples it to the input of the mixer/IF amplifier 73/84. The local oscillator 81 provides the frequency translation input signal for mixers 71 and 73.

Similarly, since multiplexer 52 places a signal on line 82 which represents the difference signal D or the guard signal G, during guard mode, line 72 contains the signal (G+jS). In track mode, line 72 contains (D+jS). The multiplexers 52 and 56 are controlled so that when (G+jS) appears on line 72, (G−jS) appears on line 80. When this occurs, the phase detector 94 determines the phase angle $\phi$ between (G+jS) and (G−jS) and provides an output voltage proportional to cos $\phi$ on line 96. The tracking unit 104 uses the sign of this voltage to make the sidelobe blanking decision. When the multiplexers 56 and 52 are clocked so that their outputs are the difference and sum signals (D) and (S) respectively, the output of the phase detector is input to the tracking unit 104 via line 96.

The tracker 104 is conventional and can operate in at least two different embodiments. In the first one, the tracker 104 is preprogrammed to expect the time of arrival of a pulse to within a time window. During this one pulse, the tracker signal is multiplexed out and the sidelobe blanking function is enabled. Hence, a decision can be made if the signal being tracked is coming in the sidelobes.

In the other embodiment, the time window of the arrival pulse is still approximately known. However, if the sum signal is split after the main antenna interface, delayed by the same time window or longer, and then combined with the sum signal again, the sum signal will be effectively applied to the combined system twice. The first time it would be used for tracking and the second time for sidelobe blanking. After the guard antenna interface, an identical time delay would be added so that the guard pulse is in time synchronization with the second pulse from the main antenna. Hence, the multiplexers 52 and 56 pass tracking signals during the first time window and sidelobe blanking signals during the second time window. The tracker 104 combines the results and decides if to use the first pulse for tracking.

Figure 3:
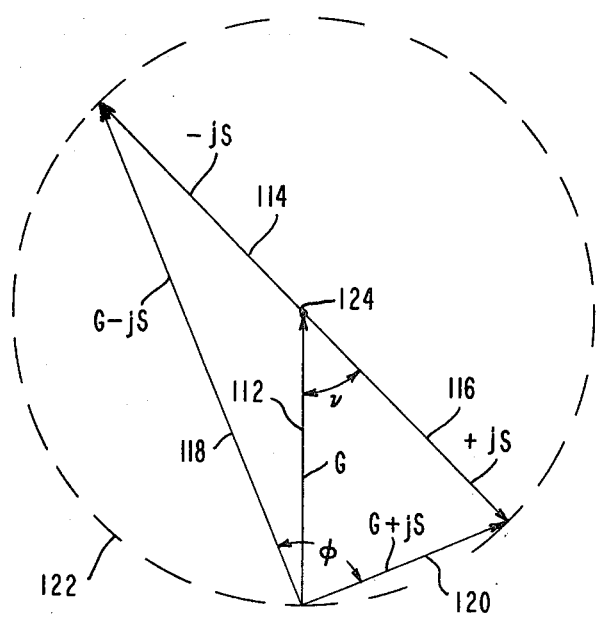
FIG. 3 is a phasor diagram showing the phase relationships between the vectors representing the outputs of the main and guard antennas and the output of the sidelobe blanking system of the present invention.

The operation of the side lobe blanking system 40 can be best explained with reference to the diagram of FIG. 3. FIG. 3 is the vector diagram of the phases at the phase detector 94. The vector 112 represents the guard signal G. Vectors 114 and 116 represent −jS and +jS respectively. Vector 118 represents (G−jS) and vector 120 represents (G+jS). The angle $\phi$ is shown as the angle between vectors 118 and 120. Obviously the length of the vector 112 represents the magnitude of the guard signal $|G|$. Similarly, the length of the vector 114 is always equal to that of the vector 116. Both represent the magnitude of the sum signal $|S|$. The dotted circle 122 is drawn by sweeping vector 114 or 116 360°. When $|G|=|S|$, vector 112 extends between the circle 122 and the origin 124.

The angle $\nu$ between vector 112 and vector 116 represents the phase error between the main antenna 16 and the guard antenna 18. It will now be shown that the cosine of $\phi$ is independent of $\nu$.

In the first instance, assume that $|G|=|S|$. In this case, the angle $\phi$ is equal to 90° for all values of $\nu$ and the cosine of $\phi$ is equal to 0.

When $|G|>|S|$, the angle $\phi$ is less than 90° for all values of $\nu$. In this event, the output of the phase detector 94 is always positive.

When $|G|<|S|$, the angle $\phi$ is greater than 90° for all values of $\nu$. In this case, $\phi$ varies between 90° and 180° and the output of the phase detector 94 will always be negative. Thus the output of the phase detector 94 changes polarity in response to the relative magnitudes of the guard and sum signals only. The magnitude of the phase error $\nu$ has no effect on its output. Thus the output phase detector 94 can be used to determine whether the signal being received is from the mainlobe region or the sidelobe region.

While the present invention has been described with reference to particular embodiments, it will be understood that the invention is not limited thereto. A variety of circuit components can be utilized to realize the functions described above. It is therefore contemplated by the appended claims to cover any and all such modifications.

What is claimed is:

1. In a radar system including main antenna means for receiving electro-magnetic energy from a target and circuit means coupled to said main antenna means for generating tracking signals corresponding to the position of said target relative to said main antenna means, an improved sidelobe blanking system comprising:

guard antenna means for receiving electro-magnetic energy reflected from a target in a sidelobe region of said main antenna means;

first phase shifting means operably coupled to the said main antenna means and for shifting the output thereof by 90°;

first summing means for summing the outputs of said guard antenna means and said first phase shifting means;

second phase shifting means coupled to the output of said first phase shifting means for shifting the output thereof by 180°;

second summing means for summing the outputs of said guard antenna means and said second phase shifting means;

phase detector means for generating an output signal corresponding to the phase angle between the outputs of said first and second summing means; and means for generating a signal which represents the cosine of the output of said phase detecting means.

* * * * *